May 6, 1924.

C. I. HALL

THERMOSTATIC CIRCUIT CONTROLLER

Filed May 26, 1921

1,492,844

Inventor:
Chester I. Hall
by *Albert G. Davis*
His Attorney

Patented May 6, 1924.

1,492,844

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

THERMOSTATIC CIRCUIT CONTROLLER.

Application filed May 26, 1921. Serial No. 472,775.

*To all whom it may concern:*

Be it known that I, CHESTER I. HALL, a citizen of the United States, residing at Fort Wayne, in the county of Allen, State of Indiana, have invented certain new and useful Improvements in Thermostatic Circuit Controllers, of which the following is a specification.

One of the objects of my invention is to provide an improved thermal responsive circuit controller which shall be simple in construction, cheap to manufacture, and nevertheless be reliable and effective in operation.

One of the objects of the invention is to provide a thermal responsive circuit controller which will be substantially unaffected by changes of ambient or room temperature, but which will operate to control the electric circuit from overloads.

The invention resides in certain features of construction and arrangement, which will be pointed out particularly hereinafter, and the scope of the invention is indicated in the appended claims.

In carrying the invention into effect in one form I provide a thermal responsive circuit controller having two relatively movable circuit controlling elements of the same thermostatic material or material having substantially similar thermal characteristics. By reason of the fact that the two elements are of the same thermostatic material or of material having substantially similar thermal characteristics, they will be similarly affected by changes of ambient or room temperature, and the elements will move practically in unison without affecting the electric circuit due to changes of room temperature. The elements are adapted to carry the current in the controlled circuit and one of the elements has a comparatively low resistance, so that the heating effect set up by the current through the elements has practically no effect in causing a movement of this element. The other element, however, has a materially higher resistance so that it forms in itself a heating unit and is thereby caused to flex or bend with respect to the other element due to the heating effect of the current through the elements. In order to form a comparatively long conductor of relatively high resistance, the second heating element may be made in the form of a grid formed of a stamping of the same thermostatic metal as the first element, or it may be made in the form of a grid by cutting slots in the solid element in such a way that the current through this element has a sinuous path through a plurality of strips of the thermostatic metal.

Figure 1:
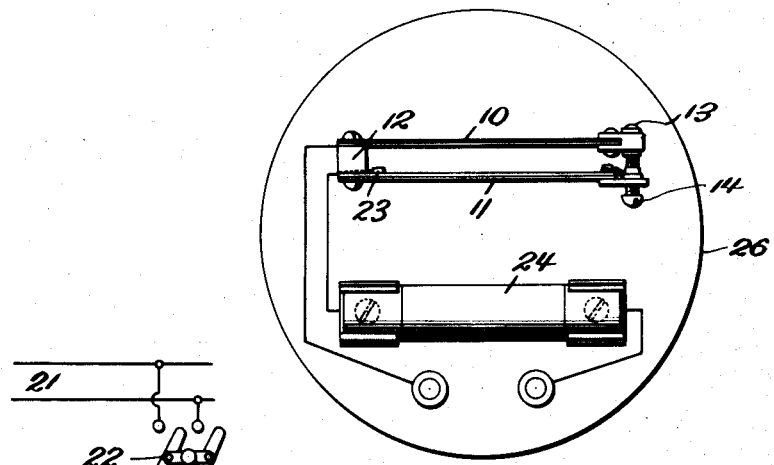
Figure 2:
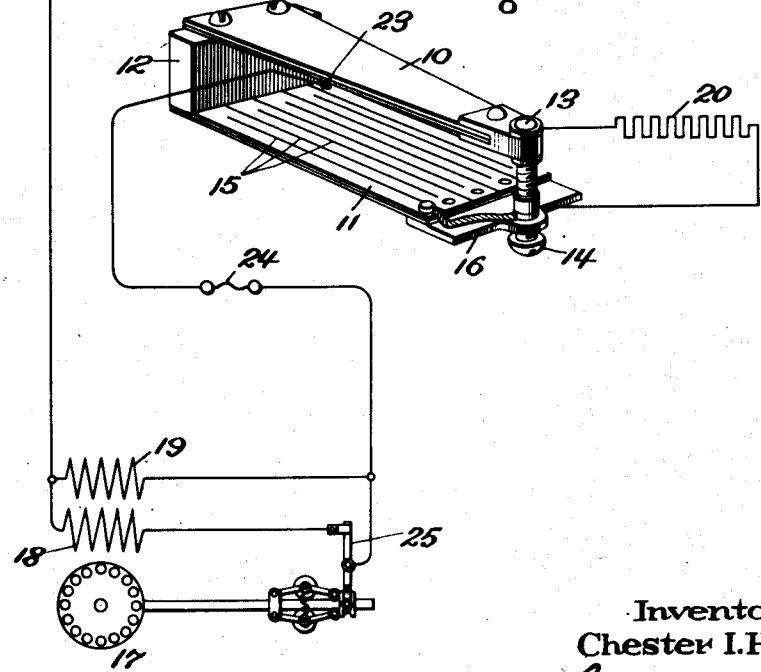

For a better understanding of my invention reference is had to the accompanying drawings wherein I have shown an embodiment of my invention for purposes of illustration, and in which Fig. 1 is a side view of my thermostatic circuit controller mounted on the base of an enclosing casing; and Fig. 2 is a very simplified motor control diagram embodying my thermostatic circuit controller.

Referring to the drawings, the thermostatic circuit controller comprises two flat thermostatic strips 10 and 11 of the same material or material having the same thermal characteristics. These strips are each composed of two layers of material which have different coefficients of expansion, the customary construction of thermostatic material.

The left hand end of the upper element 10 is secured to the corresponding end of the element 11 by means of the insulating block 12 to which both elements are attached. The right hand ends of the elements carry circuit controlling contacts 13 and 14 respectively, and the arrangement is such that by reason of the fact that the two elements are of the same thermostatic material or of material having the same thermal characteristics, the free ends of the elements will move simultaneously in response to changes of ambient or room temperature, and the contacts 13 and 14 will therefore move in unison.

The lower element 11 is made in such a way that it forms of itself a comparatively long conductor which has a materially higher electrical resistance than the element 10. The element 11 therefore forms of itself a heating unit so that the heating effect set up by the current through the elements will cause the element 11 to flex or bend and thereby move this element with respect to the element 10 to interrupt the circuit through the elements at the contacts 13 and 14. In order to make a comparatively long conductor of the element 11, it may be made in the shape of a grid as shown and be suitably stamped out of the same thermostatic material as the element 10, or if desired the element 11 may be made by cutting slots 15 therein in the manner shown in the drawing to thereby form a long conductor. The adjustable terminal 14 is mounted in the insulating strip 16 which holds the free ends of the thermostatic element 11 in their proper respective positions, and the terminal 14 is electrically connected to the one end of the grid.

While my invention is applicable generally to the control of electric circuits, I have shown it as controlling the circuit of a single-phase repulsion type induction motor having a squirrel cage rotor 17, a starting winding 18 and a running winding 19. The thermostatic circuit controller is shown as operating to include the resistor 20 in the circuit of the motor when the current taken by the motor for a predetermined interval of time is greater than a predetermined value.

The operation of my invention as thus constructed and arranged and with the parts in the various positions shown in the drawings, is as follows:—In order to connect the electric motor to the supply circuit 21, the disconnecting switch 22 will be closed, thereby establishing a circuit for the motor through the thermostatic element 10, the contact 13, the contact 14, through the comparatively long conductor of the grid element 11 to the terminal 23, through the protective fuse 24, through the running winding 19 to the other supply conductor. The starting winding 18 is also connected in multiple with the running winding 19 through the contacts of the speed responsive circuit controller 25. When the motor has reached a predetermined speed, the speed responsive contact 25 will open and thereby disconnect the starting winding from the circuit. If at any time the current taken by the motor for a predetermined interval of time is greater than a predetermined value, then the thermostatic element 11 will flex or bend so as to cause the adjustable contact 14 to break engagement with the contact 13 and thereby insert the resistor 20 in the motor circuit. That will reduce the current to the motor and prevent the motor from being burned out.

Changes or room temperature will affect both the thermostatic elements to substantially the same degree so that the circuit through the elements will only be opened responsively to the heating effect of the current in the element 11. The element 10 carries the same current as the element 11, but by reason of the comparatively large cross-section of this element, it will be substantially unaffected by the heating effect of the current through the elements. In order to vary the time element of the opening of the contacts due to a given value of current, the contact 14 has been arranged to be adjusted with respect to the contact 13. If after the thermostatic circuit controller has operated to insert the resistor 20 in the motor circuit, the current taken by the motor is still in excess of the safe value, the fuse 24 will blow and thereby completely disconnect the motor from the source of supply.

It will be apparent to those skilled in the art that while I have shown my invention as applied to an arrangement in which the circuit controlling contacts 13 and 14 are adapted to separate due to the heating effect of the current through the elements, my invention is equally applicable to an arrangement in which the contacts are adapted to move into engagement with each other after a definite time interval due to the heating effect of a predetermined value of current. It will also be understood that my thermal responsive circuit controller may be mounted within an enclosed casing, of which the base 26 on which the parts are mounted forms a part. The enclosed casing will provide a thermal storage volume.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. A thermal responsive circuit controller comprising two thermostatic circuit controlling elements of material having the same thermal characteristics movable in unison in response to changes of temperature which affect both elements similarly, one of said elements in the form of a grid resistor which is heated responsively to the circuit to be controlled and which is movable independently of the other element to control the electric circuit responsively to conditions in the electric circuit.

2. A thermal responsive circuit controller comprising two thermostatic circuit controlling elements of material having the same thermal characteristics, corresponding ends of the said elements fixed with respect to each other with the corresponding ends of the elements free and movable in unison in response to changes of temperature which affect both elements similarly, circuit controlling contacts carried by the said free ends of the elements, one of the said elements in the form of a heating grid, the free end of which moves independently of the free end of the other element responsively to the heating effect of the current in the electric circuit to be controlled.

3. A thermal responsive circuit controller comprising two thermostatic circuit controlling elements, each of said elements in the form of a flat strip of themostatic material which has substantially the same thermal characteristics as the other element, an insulator for holding corresponding ends of the said elements, the free ends of the elements movable in unison in response to changes of temperature which affect both elements similarly, one of said elements in the form of an electric heating grid, the free end of which is movable independently of the free end of the other element to control the electric circuit due to the heat generated in the said grid by the current in the electric circuit to be controlled.

4. A thermal responsive circuit controller comprising two thermostatic elements of material having the same thermal characteristics adapted to carry the current in the circuit controlled thereby, the said elements movable in unison due to changes in temperature which affect both elements similarly, one of said elements having a higher electrical resistance than the other, whereby the said element is movable independently of the said other element responsively to the heating effect of the current through the elements.

5. A thermal responsive circuit controller comprising two thermostatic elements of material having the same thermal characteristics adapted to carry the current in the circuit controlled thereby, the said elements movable in unison due to changes of temperature which affect both elements similarly, one of said elements in the form of a comparatively long conductor of relatively high electrical resistance, whereby the said element is heated to a higher temperature than and is movable independently of the other element responsively to the heating effect of the current through the element.

6. A thermal responsive circuit controller comprising two relatively movable thermostatic circuit controlling elements of similar material movable similarly in response to changes of temperature which affect both elements similarly, the first of said elements in the form of a grid resistor which has a higher resistance than the second element and moves with respect to the second element due to the heating effect of the current through the said grid.

7. A thermal responsive circuit controller comprising two circuit controlling elements of similar thermostatic material adapted to carry the current in the circuit controlled thereby, the said elements movable in unison in response to changes of ambient temperature, one of said elements substantially unaffected by the heating effect of the current through the elements and the second of said elements movable with respect to the first element due to the heating effect of the current through the elements.

8. A thermal responsive circuit controller comprising two circuit controlling elements of substantially similar thermostatic material adapted to carry the current in the circuit controlled thereby, the said elements movable in unison in response to changes of ambient temperature, one of said elements having a substantially low resistance and the second element having a substantially high resistance, whereby the second element is movable with respect to the first element due to the heating effect of the current through the elements.

9. A thermal responsive circuit controller comprising two circuit controlling elements of substantially similar thermostatic material adapted to carry the current in the circuit controlled thereby, the said elements movable in unison in response to changes of ambient temperature, one of said elements having a substantially low resistance and the second of said elements having slots therein to form a comparatively long conductor of relatively high resistance, whereby the second element is movable with respect to the first element due to the heating effect of the current through the elements.

10. A thermal responsive circuit controller comprising two circuit controlling elements of substantially similar thermostatic material adapted to carry the current in the circuit controlled thereby, the end of one of said elements insulated from and secured to the corresponding end of the other element and the free ends of the elements movable as a unit in response to changes of ambient temperature, one of said elements substantially unaffected by the heating effect of the current through the elements and the second of said elements having a path for the current of materially smaller cross section than the cross section of the path for the current through the first element, whereby the second element is movable with respect to the first element due to the heating effect of the current through the elements.

11. A thermal responsive circuit controller comprising two circuit controlling elements of equal length and of similar material adapted to carry the current in the circuit controlled thereby, circuit controlling contacts carried by corresponding ends of the elements, means for insulating the other corresponding ends of the elements from each other, and holding the elements parallel to each other with the said contacts adjacent each other so that the contacts will move in unison due to changes in ambient temperature, one of said elements substantially unaffected by the heating effect of the current through the elements, and the other element in the form of a grid resistor which is moved relatively to the other element due to the heating effect of the current through the elements.

In witness whereof, I have hereunto set my hand this 23 day of May, 1921.

CHESTER I. HALL.